(12) United States Patent
Fukuda et al.

(10) Patent No.: US 7,553,548 B2
(45) Date of Patent: Jun. 30, 2009

(54) LAMINATED SHEET FOR MOLDING

(75) Inventors: Masanobu Fukuda, Okegawa (JP); Kouji Shiota, Tokyo (JP); Tatsuya Kouyama, Toda (JP); Kenkichi Yano, Tokyo (JP)

(73) Assignee: Dainippon Ink & Chemicals, Inc., Tokyo (JP)

( * ) Notice: Subject to any disclaimer, the term of this patent is extended or adjusted under 35 U.S.C. 154(b) by 304 days.

(21) Appl. No.: 10/565,940

(22) PCT Filed: Jul. 27, 2004

(86) PCT No.: PCT/JP2004/011034

§ 371 (c)(1),
(2), (4) Date: Jan. 26, 2006

(87) PCT Pub. No.: WO2005/011977

PCT Pub. Date: Feb. 10, 2005

(65) Prior Publication Data

US 2006/0240246 A1      Oct. 26, 2006

(30) Foreign Application Priority Data

Jul. 30, 2003   (JP) ............................. 2003-203698

(51) Int. Cl.
*B32B 5/16* (2006.01)
*B32B 27/32* (2006.01)
*B32B 27/08* (2006.01)
*B05D 1/40* (2006.01)
*B05D 3/02* (2006.01)

(52) U.S. Cl. .................. 428/515; 428/220; 428/323; 428/332; 427/331; 427/372.2

(58) Field of Classification Search .................. None
See application file for complete search history.

(56) References Cited

FOREIGN PATENT DOCUMENTS

| | | |
|---|---|---|
| JP | 05-111991 | 5/1993 |
| JP | 2002-046230 | 2/2002 |
| JP | 2002-187238 | 7/2002 |
| JP | 2003-136636 | 5/2003 |
| WO | WO97/43119 A1 | 11/1997 |

*Primary Examiner*—Sheeba Ahmed
(74) *Attorney, Agent, or Firm*—Edwards Angell Palmer & Dodge LLP (57) ABSTRACT

A laminated sheet for molding comprising: a film layer which comprises thermoplastic acrylic resin, wherein the film layer is one of transparent or translucent; an intermediate layer which comprises a curable resin including a polyisocyanate compound and an acrylic resin having hydroxyl groups, wherein the curable resin is a cured material in a semi-cured state; and a decorative layer having a mirror-like metallic luster, which comprises a binder resin and fine metal grains obtained from a thin metal film; wherein the layers are laminated in the order stated.

14 Claims, 1 Drawing Sheet

LAMINATED SHEET FOR MOLDING

TECHNICAL FIELD

The present invention relates to a laminated sheet for molding and a production method thereof.

BACKGROUND ART

When a colored resin molded member is produced by a conventional method, there is a method wherein spray coating or the like is conducted after molding (a coating method), as well as a method in which pigment is kneaded into a resin itself and the obtained colored resin is injection-molded (a coloring method). Particularly, when a design having a mirror-like (specular) metallic luster is required, the coating method is used more frequently than the coloring method, because kneading of a pigment is difficult, a pigment flow trace is easily formed when the coloring method is used, and so on. In the coating method, if a coating film is heated to form a cross-linking, a surface protection effect can also be expected. However, the use of volatile organic solvent in a coating used for the coating method is the mainstream procedure at present. Therefore, the use of non-volatile organic solvent coating such as aqueous coating or powder coating has been proposed from the standpoint of protection of the operational environmental and external environmental from volatile organic solvents discharged. However, it is difficult to achieve a design having a mirror-like metallic luster using the method at present. On the other hand, a method has been introduced in which a colored sheet is laminated with a moldable resin support layer and then they are co-cured by injection molding, instead of conducting coating. The method makes it possible to produce a resin molded member with a design having a mirror-like metallic luster without the use of an organic solvent.

A sheet having a design of mirror-like metallic luster such as an aluminum-deposited polyethylene terephthalate film and a laminated sheet obtained by dry lamination of polypropylene film or the like is known. Moreover, a laminated sheet having a layer consisting of a cured film has been described in which the cured film is obtained from a coating comprising an acrylic emulsion which contains scale-like aluminum particles having a smooth surface. (For example, please refer to Japanese Unexamined Patent Application, First Publication No. H5-111991.)

However, although the surfaces of these sheets in a flat state have designs having a mirror-like metallic lusters, the stretching ability of a deposited surface of the sheets is insufficient. Therefore, when mold processing such as a vacuum molding, in-mold molding or the like is applied, retention of a design having a mirror-like metallic luster becomes insufficient, and cracks, luster irregularities and the like are caused.

Moreover, a laminated sheet having a cured film obtained from an ink, in which fine metal grains are dispersed in a binder resin varnish, is proposed. (For example, please refer to Japanese Unexamined Patent Application, First Publication No. 2002-46230.) Stretching ability can be improved by this method but it has the drawback that luster of the sheet is inferior to luster of an aluminum-deposited film or the like. In addition, the luster is further reduced during vacuum molding, and luster irregularity is caused.

An object of the present invention is to provide a laminated sheet for molding, which has a good mirror-like metallic luster, stretching ability necessary in molding, and less reduction of luster even after molding is conducted, and maintains a design having a good mirror-like metallic luster.

SUMMARY OF THE INVENTION

As a result of examinations in order to solve these problems, the inventor achieved the present invention by providing an intermediate layer made of a curable resin in a semi-cured state between a transparent or translucent thermoplastic acrylic resin film layer and a decorative layer having a mirror-like metallic luster.

Specifically, the fist aspect of the present invention is a laminated sheet for molding comprising: a film layer which comprises thermoplastic acrylic resin wherein the film layer is one of transparent or translucent; an intermediate layer which comprises a curable resin including at least one polyisocyanate compound and an acrylic resin having hydroxyl groups, wherein the curable resin is a cured material in a semi-cured state; and a decorative layer having a mirror-like metallic luster, which comprises a binder resin and fine metal grains obtained from a thin metal film; wherein the layers are laminated in the order stated.

The second aspect of the present invention is a production method of a laminated sheet for molding comprising:

a first step wherein a curable resin including a polyisocyanate compound and an acrylic resin having hydroxyl groups is applied to a thermoplastic acrylic resin film which is one of transparent or translucent;

a second step wherein a coating film obtained by the application in the first step is semi-curd at a temperature of 50° C. or less to form an intermediate layer in a semi-cured state; and a third step wherein a gravure ink including a binder resin and fine metal grains obtained from a thin film is printed on the intermediate layer in a semi-cured state obtained in the second step to form a decorative layer with a mirror-like metallic luster.

DETAILED DESCRIPTION OF THE PREFERRED EMBODIMENTS

A suitable example of present invention is described hereafter, but the present invention is not limited to the following examples. For example, constituents of these examples may also be properly combined with each other.

The present invention relates to a laminated sheet for molding having a design having a mirror-like metallic luster, and particularly to a laminated sheet for molding, which is useful in members for automobile parts, architectural materials, electrical appliances and the like.

Figure 1:
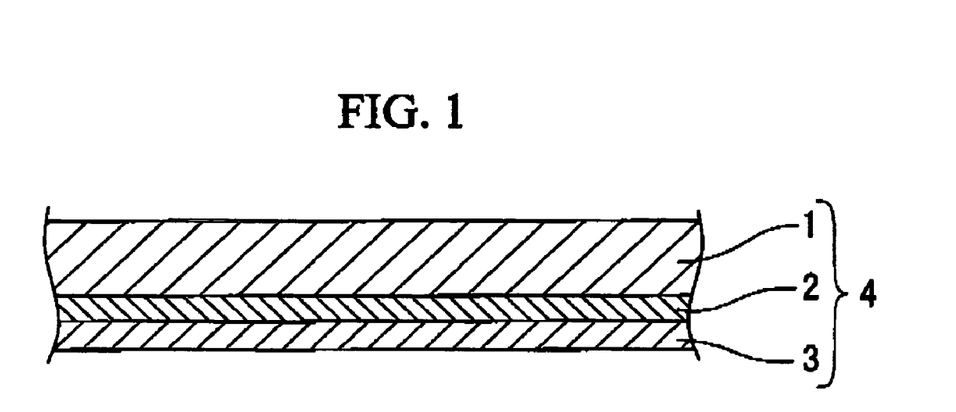
FIG. 1 is a schematic sectional view showing an example of a laminated sheet for molding of the present invention.

As shown in FIG. 1, the present invention can provide a laminated sheet for molding 4 wherein a transparent or translucent thermoplastic acrylic resin film layer 1, an intermediate layer 2 composed of a semi-cured material of a curable resin which includes a polyisocyanate compound and an acrylic resin having hydroxyl groups, and a decorative layer 3 having a mirror-like metallic luster and including a binder resin and fine metal grains obtained from a thin metal film are laminated in that order, and a production method thereof. Embodiments thereof are described below, (Acrylic Resin Film Layer)

The transparent or translucent thermoplastic acrylic resin film used in the laminated sheet for molding of the present invention is a film which forms a surface layer of a molded article, and the acrylic resin film is excellent in co-curing moldability and weather resistance. It is preferable that the acrylic resin film be a mono-layered or multilayered film wherein resin thereof has a softening point in the range of 60 to 300° C., preferably 70 to 220° C. and more preferably 80 to 190° C., since molding processing using heat such as vacuum molding or the like is conducted. The film may also include a colorant.

The film thickness of the film layer can be properly selected according to demand. For example, it may be about 50 to 300 μm, and preferably 70 to 150 μm.

(Intermediate Layer)

In the laminated sheet for molding of the present invention, a transparent or translucent thermoplastic acrylic resin film is used as a surface layer from the standpoint of ease of co-curing molding, surface hardness and weather resistance. Therefore, when a high-brightness ink for forming the decorative layer is directly printed or applied on the thermoplastic acrylic resin film, the film is easily eroded by organic solvent included in the high-brightness ink. If the interface of the acrylic resin film and the decorative layer loses its smoothness due to erosion, the orientation of fine metal grains obtained from a thin metal film included in the decorative layer becomes non-parallel to the printing surface or coating surface, and the mirror-like metallic luster easily deteriorates. The intermediate layer can be used for protecting the surface of acrylic resin film from a solvent included in the high-brightness ink used for forming the decorative layer, and the intermediate layer can keep an interface position with respect to the decorative layer smooth. The intermediate layer can bury fine surface irregularities of the acrylic resin film, increase adhesion strength as to the acrylic resin, and improve the smoothness of the interface with the decorative layer. A solvent included in a composition for forming the intermediate layer may erode the surface of the acrylic resin that exists at the interface of the acrylic resin film and the intermediate layer, but there is no problem because the intermediate layer itself can form a smooth surface for the decorative layer. The intermediate layer used in the laminated sheet for molding of the present invention can be composed of a curable resin a semi-cured state. The presence of the intermediate layer can improve solvent resistance of the laminated sheet against a solvent included in the high-brightness ink used for forming the decorative layer. Furthermore, the intermediate layer is a resin layer having crack resistance and is a substantially transparent film. That is, the intermediate layer has heat resistance, and due to heat resistance thereof, cracks are not caused in the intermediate layer itself and in the laminated sheet for molding during heat molding. In the present invention, a "semi-cured state" means that the cured material in a semi-state has a remaining unreacted hydroxyl group and unreacted isocyanato group, and also means that the reaction rate of isocyanato groups included in the polyisocyanate compound is 50 to 80%, preferably 60 to 80%, and more preferably 60 to 75%, with respect to the reaction between isocyanato groups of the aforementioned polyisocyanate compound and hydroxyl groups of the aforementioned acrylic resin having hydroxyl groups. The reacion rate can be determined by using an infrared spectrophotometer.

As the curable resin in a semi-cured state used in the intermediate layer of the laminated sheet for molding of the preset invention, a curable resin including an polyisocyanato compound and an acrylic resin having hydroxyl groups can be selected from the standpoint of ease of controlling a cross-linking reaction, weather resistance, and adhesiveness to a transparent or translucent thermoplastic acrylic resin film, and the like.

More specifically, it is preferable that the acrylic resin having hydroxyl groups be an acrylic resin which has a hydroxyl value of 10 to 100, preferably 40 to 100, a weight average molecular weight (a value based on polystyrene conversion) of 10,000 to 200,000, and a glass transition temperature (Tg) of 70 to 120° C., and preferably 75 to 115° C.

Due to the hydroxyl value of 10 or more, sufficient cross-linking density of the cross-linked polymer can be achieved, and the hardness and acid resistance of the polymer tend to be improved. Due to the hydroxyl value of 100 or less, the three-dimensional moldability tends to be improved. The particularly preferable range of the hydroxyl value is 30 to 100.

Due to the weight average molecular weight of 10,000 or more, the solvent resistance of the intermediate layer tends to be improved. When the weight avenge molecular weight exceeds 200,000, leveling property (smoothness) is lowered and the luster of the decorative layer deteriorates. The weight average molar weight is more preferably in the range of 20,000 to 100,000.

It is preferable that the glass transition temperature (hereinafter, referred to as $T_g$) of the acrylic resin having hydroxyl groups, which can be obtained by the Fox formula, be 70 to 120° C. The three dimensional moldability tends to be improved when $T_g$ of the resin is 70° C. or more.

Well-known conventional methods can be used to prepare the aforementioned acrylic resin having hydroxyl groups. Examples of especially typical methods include a method wherein an acrylic monomer having a hydroxyl group(s), which is mainly used, is copolymerized with other monomer, which can be selected as required and is copolymerizable with the acrylic monomer.

Specific examples of acrylic monomers having a hydroxyl group(s), which can be used as required to prepare an acrylic resin used in the present invention in the aforementioned method, include: hydroxyalkyl esters having two to eight carbons of acrylic acid or methacrylic acid such as 2-hydroxyethyl acrylate, 2-hydroxypropyl acrylate, 3-hydroxypropyl acrylate, hydroxybutyl acrylate, 2-hydroxyethyl methacrylate, 2-hydroxypropyl methacrylate, 3-hydroxypropyl methacrylate, hydroxybutyl methacrylate and the like; monoesters of a polyether polyol such as polyethylene glycol, polypropylene glycol polybutylene glycol and the like, and an unsaturated carboxylic acid such as acrylic acid, methacrylic acid and the like; hydroxyalkyl vinyl ethers such as hydroxyethyl vinyl ether and the like; allyl alcohols; adducts of an a,β-unsaturated carboxylic acid and an monoepoxy compound such as a-olefin epoxide and the like; monoethers of a polyether polyol such as polyethylene glycol polypropylene glycol, polybutylene glycol and the like, and a hydroxyl group-containing unsaturated monomer such as 2-hydroxyethyl acrylate, 2-hydroxyethyl methacrylate and the like; and adducts of glycidyl acrylate or glycidyl methacrylate and a monobasic acid such as acetic acid, propionic acid, p-tert-butyl benzoate, a fatty acid and the like; adducts of the aforementioned hydroxyl group-containing monomers and lactones (for example, e-caprolactone, γ-valerolactone and the like).

Examples of the aforementioned other monomer which can be copolymerized with the acrylic monomer include: alkyl esters or cycloalkyl esters having one to twenty two carbons of acrylic acid or methacrylic acid, such as n-propyl methacrylate, isopropyl methacrylate, (n-, iso- or tert-) butyl methacrylate, hexyl methacrylate, 2-ethylhexyl methacrylate, octyl methacrylate, decyl methacrylate, lauryl methacrylate, stearyl methacrylate, cyclohexyl methacrylate and the like; alkoxy-alkyl esters having two to eighteen carbons of acrylic acid or methacrylate acid, such as methoxybutyl acrylate, methoxybutyl methacrylate, methoxyethyl acylate, methoxyethyl methacrylate, ethoxybutyl acrylate, ethoxybutyl methacrylate and the like; aminoalkyl acrylates such as N,N-dimethylaminoethyl(meth)acrylate, N,N-diethylaminoethyl(meth)acrylate, N-tert-butylaminoethyl(meth)acrylate. N,N-diethylaminopropyl(meth)acrylate and the like; acrylamide monomers such as acrylamide, methacrylamide, N-methyl(meth)acrylamide, N-ethyl(meth)acrylamide, N-butyl(meth)acrylamide, N,N-dimethyl(meth)acrylamide and the like; unsaturated monocarboxylic acids such as acrylic acid, methacrylic acid and the like; carboxyl group-containing monomers such as unsaturated dicarboxylic acids such as maleic acid, itaconic acid, fumaric acid, and mesaconic acid, and anhydrides, half esters and modified compounds thereof and the like; monoester compounds or diester compounds obtained from glycols such as ethylene glycol, 1,6-hexanediol, neopentyl glycol, and the like, and an acid anhydride group-containing unsaturated compound such as maleic anhydride, itaconic anhydride and the like; glycidyl group-containing monomers such as glycidyl acrylate, glycidyl methacrylate and the like; vinyl aromatic compounds such as styrene, a-methyl styrene, vinyl toluene and the like; and ethylene, propylene, 1-butylene, 2-butylene, acrylonitrile, vinyl acetate, vinyl chloride and the like.

The acrylic resin having hydroxyl groups can be prepared by using various monomers as described above and by using various conventional polymerization processes such as a solution polymerization method, non-aqueous dispersion polymerization method, block polymerization method or the like. Among these processes, a radical polymerization method conducted in an organic solvent, which is known as a solution radical polymerization method, is particularly recommended because it is the most simple method.

In the production method, the aforementioned monomer components can be reacted at a reaction temperature of about 60 to 160° C. for about 1 to 30 hours in an organic solvent with a radical polymerization initiator such as an organic peroxide compound such as benzoyl peroxide; azo compounds such as N,N-azabisdiisobutyronitrile; a chain transfer agent such as n-dodecyl mercaptan; and/or the like. Examples of the organic solvent include: aromatic hydrocarbons such as xylene and toluene; alcohols such as isopropyl alcohol, isobutanol, and n-butanol; esters such as ethyl acetate, and butyl acetate; ketones such as methyl amyl ketone; and ethers such as cellosolve, butyl cellosolve, and cellosolve acetate.

It is preferable that the polyisocyanate compound, which is used for the laminated sheet for molding of the present invention, that is, the polyisocyanate compound(s) usable for forming the intermediate layer which is a curable resin in a semi-cured state, has two or more isocyanate groups on the average in one molecule and a number average molecular weight (a value based on polystyrene conversion) of 10,000 or less, more preferably 150 to 5,000, and particularly preferably 2,000 or less. In the present invention, "has two or more isocyanate groups on the average in one molecule" means that an isocyanate compound(s) having three or more isocyanate groups in one molecule (herein after, referred to as a trivalent or multivalent isocyanato compound) can be included as a necessary isocyanate compound component in the polyisocyanato compound used.

Specific examples of trivalent or multivalent to compounds include: aliphatic triisocyanates such as 2-isocyanatoethyl-2,6-diisocyanato caproate, 1,3,5-cyclohexane triisocyanate, 2,4,6-cycloheptane triisocyanate, 1,2,5-cyclooctane triisocyanate and the like; and aromatic triisocyanates such as 1,3,5-benzene triisocyanate, 2,4,6-naphthalene triisocyanate and the like; polyisocyanates having a so-called isocyanurate ring structure obtained by cyclic trimerization of diisocyanate. It is preferable that an isocyanate compound(s) selected from bivalent isocyanate compounds, that is diisocyanates, be used in combination with the trivalent or multivalent organic polyisocyanate compound(s).

Examples of the diisocyanates include: aliphatic diisocyanates such as hexamethylene diisocyanate, trimethyl hexamethylene diisocyanate, dimeric acid diisocyanate, lysine diisocyanate and the like; cyclic aliphatic diisocyanates such as hydrogenated xylene diisocyanate, cyclohexylene diisocyanate, 1,3-bisisocyanato methylcyclohexane, 2-methyl-1,3-diisocyanato cyclohexane, 2-methyl-1,5-diisocyanato cyclohexane, methylene bis(cyclohexylisocyanate), isophorone diisocyanate and the like; and aromatic diisocyanates such as tolylene diisocyanate, phenylene diisocyanate, diphenylmethane diisocyanate, m-xylene diisocyanate, 4,4'-diphenylmethane diisocyanate xylylene diisocyanate, a,a,a', a'-tetramethyl-m-xylene diisocyanate, tetramethylxylylene diisocyanate, naphthalene diisocyanate and the like.

Moreover, the trivalent or multivalent isocyanato compound can also be used in combination with the following compounds. For example, the trivalent or multivalent isocyanato compound can be used together with: a dimer or trimer of an isocyanato compound which has two or more valences; adducts and the like which are made by reacting the isocyanato compound, which has two or more or three or more valences, and polyhydric alcohols, low molecular weight polyester resins, water and/or the like in a condition of excess isocyanato groups; blocked polyisocyanates wherein free isocyanato groups of an isocyanate compound having free isocyanato groups are blocked with a blocking agent such as phenols, oximes, lactams, alcohols, mercaptans and the like; polyisocyanates having a biuret structure obtained by reacting water and polyisocyanates having a free isocyanato group; homopolymers of vinyl monomers having an isocyanato group such as 2-isocyanato ethyl(meth)acrylate, 3-isopropenyl-a,a-dimethylbenzyl isocyanate or (meth)acryloyl isocyanate; or various vinyl copolymers such as isocyanato group-containing acrylic copolymers, vinyl ester copolymers, fluoroolefins copolymers and the like, which are obtained by copolymerizing the isocyanato group-containing vinyl monomer with acrylic monomer, vinyl ester monomer, vinyl ether monomer, aromatic vinyl or fluoroolefin vinyl monomer, or the like.

As the blend ratio of the acrylic resin having hydroxyl groups to the polyisocyanate compound used for the intermediate layer, which is a curable resin in a semi-cured state included in the laminated sheet for molding of the present invention, it is preferable that isocyanato groups included in the polyisocyanate compound be in the range of 0.1 to 1.0 equivalent per 1 equivalent of hydroxyl groups included in the acrylic resin having hydroxyl groups from the stand point of the balance of various properties, and more preferably in the range of 0.1 to 0.6 equivalent. It is preferable that the thickness of the intermediate layer be 0.1 to 10 μm, and more preferably 0.5 to 5 μm.

When a curable resin including the aforementioned acrylic resin having hydroxyl groups and a polyisocyanate compound is reacted to be cured, a curing catalyst can be included if necessary. Examples of representative curing catalysts include: various amine compounds such as N-methylmorpholine, pyridine, 1,8-diazabicyclo[5,4,0]undecene-7

(DBU), 1,5-diazabicyclo[4,3,0]nonene-5 (DBN), 1,4-diazabicyclo[2,2,2]octane (DABCO), tri-n-butylamine or dimethylbenzylamine, butylamine, octylamine, monoethanolamine, diethanolamine, triethanolamine, imidazole, 1-methylimidazole, 2,4-dimethylimidazole, 1,4-diethylimidazole, 3-aminopropyl trimethoxysilane, 3-aminopropyl triethoxysilane, 3-(N-phenyl)aminopropyl trimethoxysilane, 3-(2-aminoethyl)aminopropyl trimethoxysilane, 3-(2-aminoethyl)aminopropylmethyl dimethoxysilane and the like; so-called quaternary ammonium salts such as tetramethyl ammonium salts, tetrabutyl ammonium salts, trimethyl(2-hydroxypropyl) ammonium salts, cyclohexyltrimethyl ammonium salts, tetrakis(hydroxylmethyl) ammonium salts, dilauryldimethyl ammonium salts, trioctylmethyl ammonium salts, o-trifluoromethylphenyltrimethyl ammonium salts, wherein examples of typical counter ions thereof can include chloride, bromide, carboxylate, hydroxide and the like; and various organometallic compounds such as dibutyltin dilaurate, dibutyltin acetate, lead dioctylate, cobalt naphthenate and the like. Moreover, the intermediate layer may include a colorant for imparting a design.

Pigment can be preferably employed as a colorant used in the intermediate layer. The employable pigments are not especially limited, and well-known pigments such as coloring pigments, metallic pigments, interference color pigments, fluorescent pigments, extender pigment and the like can be used. Examples of coloring pigments include: organic pigments such as quinacridone type pigments such as quinacridone red and the like; azo type pigments such as pigment red and the like; phthalocyanine type pigments such as phthalocyanine green and the like; perylene type pigments such as perylene red and the like; and inorganic pigments such as titanium oxide, carbon black and the like. Examples of metallic pigments include aluminum powder, nickel powder, copper powder, brass powder, chrome powder and the like.

Examples of interference color pigments include pearl mica powder having a nacreous luster, colored nacreous pearl mica powder having a nacreous luster and the like. Examples of fluorescent pigments include synthetic resin solid solution type pigments, in which fluorescent dye such as basic yellow, rhodamine B and the like is included in melamine resin or the like in a solid-solute state. Examples of extender pigment include inorganic pigments such as barium sulfate, calcium carbonate and the like. The pigment can be directly added as it is, or can be added in a conventional state of colorants used for plastic, such as in a form of color compounds, concentrated master batch, powder colorants, granular colorants, liquid colorants or the like.

These pigments may be used alone, or in combination of two or more.

If required, in order to prevent the occurrence of cracks at the time of stretching, the intermediate layer used in the laminated sheet for molding of the present invention may comprise one or more kinds of thermoplastic resins, such as polypropylene, polyethylene, ethylene-vinyl acetate copolymer (hereinafter, referred to as EVA), polyisobutylene, polybutadiene, polystyrene, polycarbonate, polymethylpentene, ionomers, acrylonitrile-butadiene-styrene copolymer (hereinafter, referred to as ABS), polyvinyl chloride, polyvinylidene chloride, acrylic resins, polyvinyl alcohol, polyamide resins, polyacetals, polyesters, modified polyphenylene ethers, alkyd resins, silicon resins, fluoro resins and the like, in so far as properties of the finally obtained product are not affected by the resins.

The laminated sheet for molding of the present invention can maintain a good mirror-like metallic luster even after molding, since the intermediate layer is adjacent to the decorative layer having a mirror-like metallic luster including a binder resin and fine metal grains. However, if necessary, a printing ink layer including a colorant may be formed between the intermediate layer and the decorative layer partly. Furthermore, as well as a section between the intermediate layer and the decorative layer, the printing ink layer including a colorant may be formed on the whole of or a part of another section in the laminated sheet, for example, the top surface of the acrylic resin film layer, between the acrylic resin film layer and the intermediate layer, between the decorative layer and the substrate layer, or the like The intermediate layer which comprises a curable resin in a semi-cured state can be formed by a process comprising: printing or applying a curable resin on a transparent or translucent thermoplastic acrylic resin film, and semi-curing the obtained coating film at a temperature of 50° C. or below. For example, in the semi-curing step, the coating film is preferably maintained at 40 to 50° C. for 3 to 4 days. Examples of usable printing or coating methods include: printing methods such as gravure printing, flexo graphic printing, screen printing and the like; and coating methods such as a gravure coater method, a gravure reverse coater method, a flexo graphic coater method, a blanket coater method, a roller coater method, a knife coater method, an air knife coater method, a kiss touch coater method, a kiss touch reverse coater method and a comma coater method, a comma reverse coater method, a micro-gravure coater method and the like.

(Decorative Layer)

The decorative layer of the laminated sheet for molding of the present invention can be formed by printing or applying a high-brightness ink, in which fine metal grains obtained from a thin metal film is dispersed in a binder resin varnish, on the intermediate layer comprising the aforementioned curable resin in a semi-cured state. Gravure inks, screen inks and the like can be used as the high-brightness ink. It is preferable that gravure ink is used in order to arrange (orient) the fine metal grains obtained from a thin metal film uniformly and to arrange the grains in parallel each other. The content of the fine metal grains, which is obtained from a thin metal film, based on nonvolatile matter included in the ink is in the range of 10 to 60% by mass, and preferably 20 to 45% by mass. A metallic powder is commonly used in a metallic ink. However, when fine metal grains obtained from a thin metal film is used in a metallic ink and the metallic ink is printed or applied to form an object, an excellent coated or printed object can be obtained since the surfaces of the fine metal grains can face in parallel to the surface of the object, and consequently a high-brightness mirror-like metallic luster can be provided. Such high-brightness can not be achieved by the metallic powder commonly used.

Examples of metal usable for the fine metal grains included in the high-brightness ink used for in the decorative layer include, aluminum, gold, silver, copper, brass, titanium, chromium, nickel, nickel chrome, stainless steel and the like. Said metals may be used alone, or in combination of two or more in a mixed state. Examples of a method for making metal object or the like into a thin metal film include: a vapor deposition method usable for metals having a low-melting point such as aluminum; a stretch method usable for metals having stretching ability such as gold, silver, copper and the like; and a sputtering method usable for metals which have a high melting point and do not have stretching ability. Among them, fine metal grains, which are obtained from a vapor-deposited metal thin film, are preferably used. The thickness of the fine metal grains, which are obtained from a metal thin film, is preferably 0.01 to 0.1 µm, more preferably 0.02 to 0.08 µm, and even more preferably 0.02 to 0.045 µm. The diameter of the fine metal grains which is dispersed in the ink, is preferably 5 to 25 µm, and more preferably 10 to 15 µm. If the grain diameter is less than 5 µm, the brightness of the coating film becomes insufficient, and if the grain diameter is greater than 25 µm, it is difficult for the fine metal grains to orient in parallel, and therefore the brightness thereof is reduced, and clogging tends to be caused in a plate when ink is printed or applied by the gravure method or screen printing method. The diameter of the fine metal grains can be measured by the coulter counter method, microscopic observation method, laser diffraction method or the like, and the average size of the flat surface part of the fine metal grains is provided as the grain diameter.

Hereinafter, an example of a method of preparing a thin metal film and fine metal grains obtained from the film is described by using an especially preferable vapor deposition method. A polyolefin film, a polyester film or the like can be used as support film for depositing a metal. After a peeling layer is provided on the support film by coating, a metal is deposited on the peeling layer to have a predetermined thickness. Then, a top coat layer can be provided on the deposition film surface by application in order to prevent oxidation of the deposition film. The same coating agent can be used for the formation of the peeling layer and the top coat layer.

Resins used in the peeling layer and the top coat layer are not especially limited. Specific examples of the resins include cellulose derivatives, acrylic resins, vinyl resins, polyamides, polyesters, EVA resins, chlorinated polypropylenes, chlorinated EVA resins, petroleum resins and the like. Examples of solvents usable for the resin include: aromatic hydrocarbons such as toluene, xylene and the like; aliphatic or alicyclic hydrocarbons such as n-hexane, cyclohexane and the like; esters such as ethyl acetate, propyl acetate and the like; alcohols such as methanol, ethanol, isopropyl alcohol and the like; ketones such as acetone, methyl ethyl ketone and the like; and alkylene glycol monoalkyl ether such as ethylene glycol monoethyl ether, propylene glycol monomethyl ether and the like.

The above metal deposition film is immersed in a solvent, which can dissolve the peeling layer and the top coat layer, and then stirring is conducted to peel the metal deposition film from the support film. Then, it is further stirred to make fine metal grains having a diameter of about 5 to 25 µm, preferably 10 to 15 µm, from the thin metal deposition film, and then filtration and drying are conducted. The solvent is not especially limited except that it must be a solvent which can dissolve the resins used in the peeling layer and the top coat layer. When the metal thin film is prepared by a sputtering method, fine metal obtained from the thin film can be obtained similar to the method described above. When a metal foil is used, the metal foil itself can be pulverized in a solvent by using a stirring apparatus to form grains having a predetermined size.

The fine metal grains obtained from a thin metal film are preferably surface-treated to increase dispersibility thereof in ink. Examples of surface-treating agents include: organic fatty acids such as stearic acid, oleic acid, palmitic acid and the like; and cellulose derivatives such as nitrocellulose, cellulose acetate propionate, cellulose acetate butyrate and ethyl cellulose, and methylsilyl isocyanate.

As a binder resin employed in the decorative layer, resins used for conventional gravure ink, flexo graphic ink, screen ink or resins commonly employed in coatings can be used. Specific examples of binder resin preferably used for coatings include: acrylic resin, vinyl chloride resin, vinylidene chloride resin, vinyl chloride-vinyl acetate resin, ethylene-vinyl acetate resin, polyolefin resin, chlorinated olefin resin, ethylene-acrylic resin, polyurethane resin, polyamide resin, urea resin, epoxy resin, polyester rein, petroleum resin, cellulose derivative resin and the like. Moreover, resins, in which a polar group such as carboxyl group, phosphoric acid group, sulfonic acid group, amino group, quaternary ammonium salt group or the like is chemically combined therein, may be used alone or in combination with other resins.

If necessary, various additives which can be employed in conventional gravure ink, flexo graphic ink, screen ink, coatings or the like can be included in the high-brightness ink used for the decorative layer, in order to provide antiforming properties, sedimentation preventing properties, pigment dispersing properties, fluidity modification, blocking inhibiting properties, antistatic properties, oxidation inhibiting property, photo stability, UV absorption, internal cross-linking and/or the like, in so far as the design and stretching ability are not inhibited by the additives. Examples of additives include coloring pigments, dyes, waxes, plasticizers, leveling agents, surfactants, antifoaming agents, chelating agents, polyisocyanates and the like.

The film thickness of the decorative layer can be determine as required. The thickness is preferably 0.05 to 3 µm, more preferably 0.5 to 2 µm, and even more preferably 1 to 2 µm.

The high-brightness ink usable in the decorative layer is a solvent type ink. Well-known conventional solvents which can be employed in conventional gravure ink, flexo graphic ink, screen ink, coatings and the like can be used for the ink. Specific examples of solvents include: aromatic hydrocarbons such as toluene, xylene and the like; aliphatic or alicyclic hydrocarbons such as n-hexane, cyclohexane and the like; esters such as ethyl acetate, propyl acetate and the like; alcohols such as methanol, ethanol, isopropyl alcohol and the like; ketones such as acetone, methyl ethyl ketone; and alkylene glycol monoalkyl ethers such as ethylene glycol monoethyl ether, propylene glycol monomethyl ether and the like.

The grain diameter of the fine metal grains, which are blended into a high-brightness ink used for the decorative layer of the laminated sheet for molding of the present invention, is preferably 5 to 25 µm, and more preferably 10 to 15 µm. When kneading using a roller mill or the like is conducted, the fine metal grains obtained from a thin film become very fine particles, and the metallic luster deteriorates extremely. Accordingly, kneading is not conducted in the present invention, and raw materials comprising the aforementioned binder resin, the fine metal grains obtained from a thin film and the solvent can be simply mixed with a mixer to form an ink.

(Substrate Layer)

The laminated sheet for molding of the present invention may include a substrate layer which comprises a thermoplastic resin, such that the substrate layer is provided on one surface of the decorative layer, wherein an intermediate layer is provided on the other surface thereof.

A sheet which includes thermoplastic resin as a main component can be used for the substrate layer, since a molding process using heat such as vacuum molding or the like is conducted. Moreover, when a laminated sheet for molding obtained after vacuum molding is further subjected to injection molding, it is preferable that a thermoplastic resin substrate sheet be selected so that the sheet can have good adhesiveness with a resin used in injection molding.

For these reasons, examples of resins usable for the substrate layer include: general purpose resins such as acrylonitrile/butadiene/styrene resins (ABS), acrylonitrile/acrylic rubber/styrene resins (AAS), acrylonitrile/ethylene rubber/ styrene resins (AES), polyethylene resins (PE), polypropylene resins (PP), vinyl chloride resins (PVC) and the like, and thermoplastic elastomers (TPE) such as olefin elastomers (TPO), vinyl chloride elastomers (TPVC), styrene elastomers (SBC), urethane elastomers (TPU), polyester elastomers (TPEE), polyamide elastomers (TPAE) and the like. These materials may be used alone or by mixing (blending) two or more. The substrate layer may be a laminated sheet obtained by extruding materials each having different characteristics together. The substrate layer may be constructed from plural layers.

(Adhesive Layer)

Figure 2:
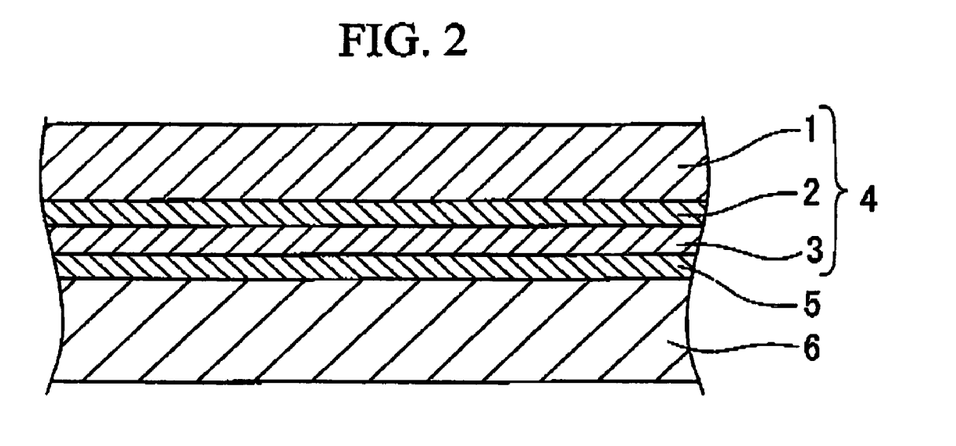
FIG. 2 is a schematic sectional view showing an example wherein an adhesive layer and a substrate layer are further provided on the laminated sheet of FIG. 1.

Examples of a method for further laminating a substrate layer selected from aforementioned various resin sheets on a printed or applied decorative layer include: a method wherein an adhesive is interposed as an adhesive layer 5 between an decorative layer 3 and a substrate layer 6 as shown in FIG. 2; and a method wherein an adhesive is not interposed. Examples of preferable adhesives include dry laminate adhesive, wet laminate adhesive, heat seal adhesive, hot melt adhesive and the like. A thermal laminate which does not use a specific adhesive layer can also be used. In such case, a resin which shows adhesiveness in a range from ordinary temperatures to about 60° C. may be used as a binder resin for the decorative layer.

A layer having stickiness can be provided in place of the adhesive layer. Examples of agents for providing stickiness include: acrylic type agent, rubber type agent polyalkyl silicon type agent, urethane type agent, and polyester type agent and the like.

(Printing or Applying Method)

Examples of printing and applying methods for the decorative layer and for providing an adhesive usable for the laminated sheet for molding of the present invention include: printing methods such as gravure printing, flexo graphic printing, screen printing and the like; and applying methods such as a gravure coater method, a gravure reverse coater method, a flexo graphic coater method, a blanket coater method, a roller coater method, a knife coater method, an air knife coater method, a kiss touch coater method, a kiss touch reverse coater method and a comma coater method, a comma reverse coater method, a microgravure coater method and the like.

(Other)

In the laminated sheet for molding of the present invention, one or more top coat layers, which are transparent, translucent, and/or colored clear layer, can be provided on the laminated sheet at a surface side of a molded product (on a surface side of the acrylic resin film layer), in order to impart properties such as excellent design, friction resistance, scratch resistance, weather resistance, contamination resistance, water resistance, chemical resistance and heat resistance and the like. Examples of top coat agents to be used for forming the top coat layer include: lacquer type agent, cross-linking type agent which include isocyanate or epoxy and the like, UV cross-linking type agent, and EB cross-linking type agent.

The laminated sheet for molding of the present invention can be used for various molding processes as a surface layer of a molded product which can be manufactured by the molding processes. For example, an insert injection molding method can be used, wherein the laminated sheet for molding of the present invention is placed such that the transparent or translucent thermoplastic acrylic resin film thereof is positioned on the upper side, and then the laminated sheet is made into a preliminary molded article having a three-dimensional shape by a method of heat molding, and then the preliminary molded article obtained is inserted into an injection molding metal die to be integrated with an injected resin. Moreover, it can also be used for an in-mold injection molding process wherein a laminated sheet for molding of the present invention, which maintains a sheet shape, is inserted into an injection molding metal die and then integrated with an injected resin in a metal die. Due to excellent stretching ability of the laminated sheet for molding of the present invention, excellent design, that is mirror-like metallic luster, can be kept even in a portion where it is stretched to a high degree.

In the present invention, the stretching ability is evaluated as followed from a standpoint of crack resistance. The crack resistance can be determined based on cracks occurring in the sheet after molding. At first the mold processing is conducted at a temperature higher than the softening point of materials included in a laminated sheet for molding (for example, sheet temperature: about 100 to 170°). Subsequently, the thickness of the laminated sheet for molding is measured, and whether or not cracks exist is visually determined at a section having ½ thickness based on the thickness before the mold processing (a section where the surface area is stretched to have twice its original area, called a 200% stretched part). A case where cracks occur is represented as "x", a case where no cracks occur is represented as "○", and a case where cracks cannot be visually found but fine cracks are found if it is observed under a microscope with a magnification of 200 to 500 times is represented as "Δ". Regarding the laminated sheet for molding of the present invention, a state of "○" to "Δ" where no cracks occur at the macroscopic level in a 200% stretched part is considered acceptable. Similarly, the luster is measured and cracks are visually checked for after stretching, in a section of a 130% stretched part where the thickness becomes 1/1.3 times, that is, the surface area becomes 1.3 times the original area, and in a section of a 150% stretched part where the thickness becomes 1/1.5 times, that is, the surface area becomes 1.5 times the original area.

In the present invention, the variation of brightness of a stretched sheet is evaluated as a change rate of surface luster value determined by using a gloss meter:

MIRROR-TRI-GLOSS (manufactured by BYK-Gardner Corporation) under conditions of 20° C./20° C., wherein measurement is conducted from the side of a transparent or translucent thermoplastic acrylic resin film of the sheet.

Change rate of surface luster value=(luster value of non-stretched part−luster value of stretched part)÷ (luster value of non-stretched part)×100 (%)

In the present invention, it is preferable that the change rate of surface luster be 30% or less, and more preferably 25% or less, with respect to the 130% stretched part, 150% stretched part and 200% stetcher part of the laminated sheet.

The mold processing is conducted by vacuum molding under conditions of sheet temperate of 155° C. and metal die temperature of 60 to 80° C. using a test metal die having a trapezoidal shape, which has a square top surface having 5 cm sides, a bottom square surface having 7 cm sides, and side surfaces having 2 cm sides, such that sheet holding position is changed so that the area of a sheet provided on the top surface is stretched to 130%, 150% or 200% size.

EXAMPLES

The present invention is specifically described by using examples below, but it is not restricted to these examples. The terms "parts" and "%" in the examples represent "parts by mass" and "% by mass".

(1) Fine Grains Obtained from an Aluminum Thin Film

A nitrocellulose (HIG7) was dissolved in a mixed solvent (ethyl acetate:isopropyl alcohol=6:4) to prepare a 6% solution. The solution was applied on a polyester film by using a gravure cylinder having a screen line number of 175 (lines/inch) and a cell depth of 25 μm to form a peeling layer. After the layer was completely dried, aluminum was deposited on the peeling layer so that the thickness of aluminum became 0.04 μm. Then, a nitrocellulose solution which was the same as those used in the peeling layer was applied under the same conditions to form a top coat layer on the deposited surface.

The aforementioned deposited film was immersed in a mixed solvent (ethyl acetate:isopropyl alcohol=6:4) to peel off the aluminum deposited film from the polyester film, and then the aluminum deposited film was pulverized by using a stirring apparatus so that the size of grains obtained from the aluminum deposited film became about 150 μm, and aluminum grains obtained from the thin aluminum film was prepared.

(2) Slurry of Aluminum Fine Grains Obtained from an Aluminum Thin Film

| | |
|---|---|
| Aluminum grains obtained from an aluminum thin film | 10 parts |
| Ethyl acetate | 35 parts |
| Methyl ethyl ketone | 30 parts |
| Isopropyl alcohol | 30 parts |

5 parts of a nitrocellulose solution having the following composition was added while mixing and stirring the above components.

| | |
|---|---|
| Nitrocellulose (HIG1/4) | 25 parts |
| Mixed solvent (ethyl acetate:isopropyl alcohol = 6:4) | 75 parts |

The mixture obtained was stirred until the size of the fine aluminum grains became 5 to 25 μm by using a turbo mixer while keeping the temperature at 35° C. or below to prepare a slurry of fine aluminum grains (non-volatile matter: 10%).

(3) Intermediate Layer

Synthesis example of acrylic resin having hydroxyl groups used in the intermediate layer is given below.

In the example, the weight average molecular weight described is a polystyrene conversion value which was obtained as a result of GPC measurement. Each solid content was calculated based on mass after drying. The mass after drying was obtained such that 1 g of a sample provided in an aluminum dish was spread thinly and uniformly with toluene, and it was air-dried, and then the sample was further dried in a hot air dryer at 108° C. for 1 hour. The hydroxyl value thereof was calculated as a KOH neutralization amount based on the composition of used monomers. The polymer $T_g$ was measured by DSC, and the acid value was determined using a titration method using a solution of 0.05 mol·dm$^{-3}$ potassium hydroxide-toluene.

(Synthesis Example 1 of Acrylic Resin Having Hydroxyl Groups)

Into a reaction vessel equipped with a temperature regulator, a nitrogen inlet tube, dropping devices (two) and a stirring device, 850 parts of butyl acetate and 1 part of PERBUTYL Z (trade name, manufactured by NOF corporation, t-butyl peroxybenzoate, "PERBUTYL" is a registered trade name of this company) were poured, and after replacement of air in the vessel with nitrogen, the mixture was heated to 110° C. over 1.5 hours.

Separately, a solution prepared by well mixing 660 parts of methyl methacrylate, 150 parts of t-butyl methacrylate and 190 parts of 2-hydroxyethyl methacrylate (hereinafter, referred to as a monomer solution) and a solution prepared by well mixing 200 parts of isobutyl acetate, 9 parts of PERBUTYL O (trade name, manufactured by NOF corporation, t-butyl peroxy-2-ethyl hexanoate) and 2 parts of PERBUTYL Z (trade name, manufactured by NOF corporation, t-butyl peroxybenzoate) (hereinafter, cited as a catalyst solution) were poured into each of the dropping devices, and then nitrogen replacement was conducted immediately.

The aforementioned monomer solution and catalyst solution were dropped into the reaction vessel over 5 hours in a nitrogen atmosphere while the reaction temperature was monitored to ensure that it did not rise rapidly. After the completion of dropping, stirring was conducted for about 15 hours to obtains resin composition (O-1) having 60% solid content. The weight average molecular weight of the obtained resin was 100,000, the hydroxyl value of the solid was 79, and $T_g$ was 95° C.

(Synthesis Example 2 of an Acrylic Resin Having Hydroxyl Groups)

Into a reaction vessel equipped with a temperature regulator, a nitrogen inlet tube, dropping devices (two) and a stirring device, 850 parts of butyl acetate and 1 parts of PERBUTYL Z (trade name, manufactured by NOF corporation, t-butyl peroxybenzoate) were poured, and after replacement of air in the vessel with nitrogen, heated to 110° C. over 1.5 hours while stirring.

Separately, a solution prepared by well mixing 650 parts of methyl methacrylate, 100 parts of n-butyl methacrylate, 40 parts of 2-ethylhexyl methacrylate, 165 parts of 2-hydroxyethyl acrylate, 40 parts of allyl methacrylate and 5 parts of methacrylic acid (hereinafter, referred to as a monomer solution) and a solution prepared by well mixing 200 parts of isobutyl acetate, 11 parts of PERBUTHY O (trade name, manufactured by NOF corporation, t-butyl peroxy-2-ethylhexanoate) and 2 parts of PERBUTHY Z (trade name, manufactured by NOF corporation, t-butyl peroxybenzoate) (hereinafter, cited as a catalyst solution) were poured each of the dropping devices, and then nitrogen replacement was conducted immediately.

The aforementioned monomer solution and catalyst solution were dropped into the reaction vessel over 5 hours in a nitrogen atmosphere while the reaction temperature was monitored to ensure that it did not rise rapidly. After the completion of dropping, stirring was conducted for about 15 hours, and as a result, a resin composition (O-2) having 51% solid content was obtained. The weight-average molecular weight of the obtained resin was 16,800, the hydroxyl value of the solid thereof was 72, and $T_g$ was 72° C.

(Synthesis Example 3 of an Acrylic Resin Having Hydroxyl Groups)

Into a reaction vessel equipped with a temperature regulator, a nitrogen inlet tube, dropping devices (two) and a stirring device, 800 parts of isobutyl acetate and 1 parts of PERBUTYL Z (trade name, manufactured by NOF corporation, t-butyl peroxybenzoate) were poured, and after replacement of air in the vessel with nitrogen, the mixture was heated to 110° C. over 1 hour while stirring.

Separately, a solution prepared by well mixing 600 parts of methyl methacrylate, 100 parts of n-butyl methacrylate, 295 parts of PLACCEL FM-1 (trade name, manufactured by Daicel Chemical Industries, Ltd., lactone modified methacrylate, "PLACCEL" is a registered trade name of this company) and 5 parts of methacrylic acid (hereinafter, referred to as a monomer solution) and a solution prepared by well mixing 185 parts of butyl acetate, 10 parts of PERBUTYL O (trade name, manufactured by NOF corporation, t-butyl peroxy-2-ethylhexanoate) and 2 parts of PERBUTYL Z (trade name, manufactured by NOF corporation, t-butyl peroxybenzoate) (hereinafter, referred to as a catalyst solution) were charged into each of the dropping devices, and then nitrogen replacement was conducted immediately.

The aforementioned monomer solution and catalyst solution were dropped into the reaction vessel over 4 hours in a nitrogen atmosphere while the reaction temperature was monitored to ensure that it did not rise rapidly. After the completion of dropping, stirring was conducted for about 16 hours, and a resin composition (O-3) having 52% solid content was obtained. The weight-average molecular weight of the obtained resin was 115,000, the hydroxyl value of the solid was 68, and $T_g$ was 55° C.

(Polyisocyanate Compounds)

"BURNOCK DN-980" (trade name, manufactured by Dainippon Ink and Chemicals, Incorporated, a polyisocyanate containing an isocyanurate ring, number average molecular weight: 800, nonvolatile content: 75% (solvent: ethyl acetate), number of functional groups 3, NCO concentration 15%, "BURNOCK" is a registered trade name of this company) was used as a polyisocyanate compound (N-1).

"BURNOCK DN-981" (trade name, manufactured by Dainippon Ink and Chemicals, Incorporated, a polyisocyanate containing an isocyanurate ring, number average molecular weight: about 1,000, non-volatile content: 75% (solvent: ethyl acetate), number of functional groups 3, NCO concentration 13 to 14%) was used as a polyisocyanate compound (N-2).

A solution for forming an intermediate layer was prepared by blending the above acrylic resin having hydroxyl groups (O-1 to 3) and polyisocyanate compounds (N-1 to 2) at a predetermined ratio and then mixing.

(4) Ink (Preparation Example of Ink)

| | |
|---|---|
| Slurry of fine aluminum grains obtained from an aluminum thin film (non-volatile content: 10%) | 30 parts |
| Binder resin: vinyl chloride containing carboxylic acid -vinyl acetate resin ("VINYLITE VMCH" manufactured by Union Carbide Corporation (UCC)) | 3 parts |
| Urethane resin | 8 parts |

("POLYURETHANE 2593" manufactured by Arakawa Chemical Industries, Ltd. nonvolatile content: 32%)

| | |
|---|---|
| Ethyl acetate | 23 parts |
| Methyl ethyl ketone | 26 parts |
| Isopropanol | 10 parts |

The above materials were mixed to prepare an ink B-1 in which the concentration of fine aluminum grains included in non-volatile content was 35% by mass.

(5) Adhesive (Preparation Example of Adhesive)

A two liquid type adhesive D-1 comprising 100 parts of an aromatic polyether urethane resin (DICDRY AS-106A, manufactured by Dainippon Ink and Chemicals, Incorporated, and "DICDRY" is a registered trade name of this company) as a main component and 10 parts of an epoxy (LR-100, manufactured by Dainippon Ink and Chemicals, Incorporated) as a curing agent was obtained.

A rubber modified PMMA film (hereinafter, referred to as a film A), which was transparent and had a surface luster value of 150 (60°/60°) and a thickness of 100 μm, was used as a thermoplastic acrylic resin film, and an ABS film (hereinafter, referred to as a film C), which was opaque and had a thickness of 300 μm and color of gray, was used as a substrate layer.

Examples 1 to 8, Comparative Example 1

The layer constitution was provided as film A/intermediate layer/ink B-1/adhesive D-1/film C. An intermediate layer was provided by applying a solution, which was blended and mixed at a ratio shown in Table 1, on a film A by using a microgravure coater so that a dried film thickness thereof became 2.0 μm and then aging it at 40° C. for 3 days. Subsequently, ink B-1 was applied using a gravure coater thereon and dried to have a dried film thickness of 2.0 μm. Adhesive D-1 was coated thereon to have a coating weight of 5.0 g/m² using a gravure coater, and it immediately adhered to the film C, and the resultant laminated sheet for molding was aged at 40° C. for 3 days. Then, the laminated sheet for molding was mold-processed with a vacuum molding method.

The reaction rate of the intermediate layer was determined by using an infrared spectrophotometer after the solution blended and mixed at a ratio shown in Table 1 was coated onto film A to have a dry film thickness of 2.0 μm and then aged at 40° C. for 3 days.

The mold-processing was conducted by using a vacuum molding method under conditions of sheet temperature of 155° C. and metal die temperature of 60 to 80° C. wherein a test metal die having a trapezoidal shape was used. The test metal die had a square top surface having 5 cm sides, a bottom square surface having 7 cm sides, and side surfaces having 2 cm sides; and the sheet holding position was changed so that the sheets provided on the square top surface were stretched to 130%, 150% and 200% stretched (increase) size.

TABLE 1

| | O | $T_g$ of O (° C.) | N | N/O Ratio | Ethyl acetate |
|---|---|---|---|---|---|
| Example 1 | (O-1) 100 | 95 | (N-1) 11.8 | 0.3 | 200 |
| Example 2 | (O-1) 100 | 95 | (N-1) 19.7 | 0.5 | 200 |
| Example 3 | (O-1) 100 | 95 | (N-2) 21.9 | 0.5 | 200 |
| Example 4 | (O-2) 100 | 72 | (N-1) 18.0 | 0.5 | 200 |
| Example 5 | (O-1) 100 | 95 | (N-1) 31.5 | 0.8 | 200 |
| Example 6 | (O-1) 100 | 95 | (N-1) 39.4 | 1.0 | 200 |
| Example 7 | (O-3) 100 | 55 | (N-1) 17.0 | 0.5 | 200 |
| Example 8 | (O-1) 100 | 95 | (N-1) 2.0 | 0.05 | 200 |

TABLE 1-continued

|  | O | $T_g$ of O (° C.) | N | N/O Ratio | Ethyl acetate |
|---|---|---|---|---|---|
| Comparative Example 1 | (O-1) 100 | 95 | (none) | 0.0 | 200 |

The meanings of the abbreviations in Table 1 are shown below.
O: acrylic resin having hydroxyl groups
N: polyisocyanate
N/O ratio: molar ratio of functional groups of polyisocyanate compound to those of acrylic resin having hydroxyl groups.

TABLE 2

|  |  | Example 1 | Example 2 | Example 3 | Example 4 |
|---|---|---|---|---|---|
| Reaction rate (%) |  | 78 | 73 | 73 | 70 |
| Luster before molding |  | 290 | 300 | 310 | 330 |
| After 130% stretch molding | Luster | 250 | 270 | 280 | 290 |
|  | Change rate | 14% | 10% | 10% | 12% |
|  | Cracking | ○ | ○ | ○ | ○ |
| After 150% stretch molding | Luster | 230 | 260 | 270 | 275 |
|  | Change rate | 21% | 13% | 13% | 17% |
|  | Cracking | ○ | ○ | ○ | ○ |
| After 200% stretch molding | Luster | 220 | 250 | 255 | 260 |
|  | Change rate | 24% | 17% | 18% | 21% |
|  | Cracking | ○ | ○ | ○ | ○ |

TABLE 3

|  |  | Example 5 | Example 6 | Example 7 | Example 8 | Comparative Example 1 |
|---|---|---|---|---|---|---|
| Reaction rate (%) |  | 65 | 60 | 72 | 80 | — |
| Luster before molding |  | 380 | 400 | 350 | 200 | 150 |
| After 130% stretch molding | Luster | 340 | 365 | 320 | 165 | 110 |
|  | Change rate | 10% | 9% | 9% | 17% | 27% |
|  | Cracking | ○ | ○ | ○ | ○ | ○ |
| After 150% stretch molding | Luster | 330 | 350 | 310 | 150 | 95 |
|  | Change rate | 13% | 12% | 11% | 25% | 37% |
|  | Cracking | ○ | Δ | Δ | ○ | ○ |
| After 200% stretch molding | Luster | 320 | 345 | 300 | 140 | 80 |
|  | Change rate | 15% | 14% | 14% | 30% | 47% |
|  | Cracking | Δ | Δ | Δ | ○ | ○ |

TABLE 4

|  | Film thickness of intermediate layer (μm) | Luster before molding | 200% Stretch | | |
|---|---|---|---|---|---|
|  |  |  | Luster | Change rate (%) | Cracking |
| Example 9 | 0.5 | 250 | 190 | 24 | ○ |
| Example 10 | 4.0 | 340 | 300 | 12 | ○ |
| Example 11 | 0.05 | 200 | 160 | 20 | ○ |
| Example 12 | 10.0 | 350 | 320 | 9 | Δ |

INDUSTRIAL APPLICABILITY

The laminated sheet for molding of the present invention has an initial good mirror-like metallic luster, stretching ability necessary for molding such as in a vacuum molding process and the like, and can maintain a good mirror-like metallic luster with little reduction of luster.

More specifically, the present invention can provide a laminated sheet for molding which has a good initial mirror-like metallic luster, and stretching ability necessary in molding, specifically the sheet has crack resistance against stretching conducted in a thermal vacuum molding process, and the laminated sheet can provide excellent design having a good mirror-like metallic luster even after molding and can provide sufficient surface hardness without a post-curing process.

Examples 9 to 12

The layer constitution was provided as film A/intermediate layer/ink B-1/adhesive D-1/film C. Laminated sheets for molding were obtained similarly to in Example 1 except that an intermediate layer was applied by using a micro-gravure coater with a solution, which was blended and mixed at the ratio described in Example 2, to have a dried thickness shown in following Table 2. Subsequently, the same molding processing as example 1 was conducted by using a vacuum molding process.

The invention claimed is:

1. A laminated sheet for molding comprising: a film layer which comprises thermoplastic acrylic resin wherein the film layer is one of transparent or translucent; an intermediate layer which comprises a curable resin including at least one polyisocyanate compound and an acrylic resin having hydroxyl groups, wherein the curable resin is a cured material in a semi-cured state; and a decorative layer having a mirror metallic luster, wherein the decorative layer comprises a binder resin and fine metal grains having a diameter of 5 to 25 μm obtained from a thin metal film; wherein the layers are laminated in the order stated.

2. The laminated sheet for molding according to claim 1, wherein the curable resin includes the polyisocyanate compound and the acrylic resin having hydroxyl groups; the acrylic resin having hydroxyl groups has a glass transition temperature of 70 to 120° C., a hydroxyl value of 10 to 100, and a weight average molecular weight of 10,000 to 200,000; isocyanato groups included in the polyisocyanate compound are in the range of 0.1 to 1.0 equivalent per 1 equivalent of hydroxyl groups in the acyrlic resin having hydroxyl groups, and the cured material in a semi-cured state contains remaining unreacted hydroxyl groups and unreacted isocyanato groups.

3. The laminated sheet for molding according to claim 1, wherein the decorative layer is a dried film of a gravure ink including a binder resin and fine metal grains obtained from a thin metal film.

4. The laminated sheet for molding according to claim 1, wherein a substrate layer comprising a thermoplastic resin is further provided on one surface of the decorative layer wherein the intermediate layer is provided on the other surface.

5. The laminated sheet for molding according to claim 1, wherein the semi-cured state is a state in which the reaction rate of isocyanato groups of the polyisocyanate compound determined by an infrared spectrophotometer is 50 to 80% with respect to a reaction between isocyanato groups in the isocyanate compound and hydroxyl groups in the acrylic resin having hydroxyl groups.

6. The laminated sheet for molding according to claim 1, wherein the softening point of the acrylic resin of the film layer is in the range of 60 to 300° C.

7. The laminated sheet for molding according to claim 2, wherein the hydroxyl value of the acrylic resin having hydroxyl groups is 40 to 100.

8. The laminated sheet for molding according to claim 1, wherein the polyisocyanate compound has two or more isocyanato groups on average in one molecule and has a number average molecular weight of 10,000 or less.

9. The laminated sheet for molding according to claim 1, wherein the thickness of the intermediate layer is 0.1 to 10 μm.

10. The laminated sheet for molding according to claim 1, wherein the decorative layer is a layer wherein the content of fine metal grains based on nonvolatile content included in an ink is 10 to 60% by mass.

11. The laminated sheet for molding according to claim 1, wherein
the fine metal grains are grains obtained from a vapor deposited metal thin film of at least one selected from a group consisting of aluminum, gold, silver, copper, titanium, chromium and nickel, or grains selected from a group consisting of grains of brass, grains of nickel chrome and grains of stainless steel.

12. The laminated sheet for molding according to claim 1, wherein the thickness of the fine metal grains obtained from a thin metal film is 0.01 to 0.1 μm, and the diameter thereof is 10 to 15 μm.

13. The laminated sheet for molding according to claim 1, wherein the film thickness of the decorative layer is 0.05 to 3 μm.

14. A production method of a laminated sheet for molding comprising:
a first step wherein a curable resin including at least one polyisocyanate compound and an acrylic resin having hydroxyl groups is applied to a thermoplastic acrylic resin film which is one of transparent or translucent;
a second step wherein a coating film obtained by the application in the first step is semi-cured at a temperature of 50° C. or less to form an intermediate layer in a semi-cured state; and a third step wherein a gravure ink including a binder resin and fine metal grains obtained from a thin metal film is printed on the intermediate layer in a semi-cured state obtained in the second step to form a decorative layer with a mirror metallic luster.

* * * * *